United States Patent
Mancl

(10) Patent No.: US 9,707,580 B1
(45) Date of Patent: Jul. 18, 2017

(54) HIGH VOLTAGE FAN MOTOR POWERED BY LOW VOLTAGE

(71) Applicant: Dennis J. Mancl, Bluff City, TN (US)

(72) Inventor: Dennis J. Mancl, Bluff City, TN (US)

( * ) Notice: Subject to any disclaimer, the term of this patent is extended or adjusted under 35 U.S.C. 154(b) by 445 days.

(21) Appl. No.: 14/588,911

(22) Filed: Jan. 3, 2015

(51) Int. Cl.
| | |
|---|---|
| *H02K 7/14* | (2006.01) |
| *B05B 7/24* | (2006.01) |
| *H02P 6/14* | (2016.01) |
| *H02P 27/06* | (2006.01) |
| *F04D 19/00* | (2006.01) |
| *F04D 25/06* | (2006.01) |
| *H02K 5/14* | (2006.01) |

(52) U.S. Cl.
CPC .......... *B05B 7/2491* (2013.01); *F04D 19/002* (2013.01); *F04D 25/0673* (2013.01); *H02P 6/14* (2013.01); *H02P 27/06* (2013.01); *H02K 5/148* (2013.01); *H02K 7/145* (2013.01)

(58) Field of Classification Search
CPC ......... H02K 7/145; H02K 5/148; H01H 9/063
USPC .................... 310/50, 68 A, 71; 388/816, 815
See application file for complete search history.

(56) References Cited

U.S. PATENT DOCUMENTS

| | | | |
|---|---|---|---|
| 1,821,525 A | 9/1931 | Nielsen | |
| 5,195,253 A | 3/1993 | Poumey et al. | |
| 5,465,016 A | 11/1995 | Mancl et al. | |
| 6,987,338 B1 | 1/2006 | Lavasser et al. | |
| 7,265,468 B1 | 9/2007 | Mancl et al. | |
| 7,345,437 B2 * | 3/2008 | Baer ...................... | A47L 9/2878 310/68 A |
| 7,412,781 B2 * | 8/2008 | Mattinger ............. | F24H 3/0423 34/96 |
| 7,518,274 B1 | 4/2009 | Mancl et al. | |
| RE41,212 E | 4/2010 | Lavasser et al. | |
| 8,297,949 B1 | 10/2012 | Mancl et al. | |
| 8,387,898 B1 | 3/2013 | Mancl et al. | |
| 9,603,430 B2 * | 3/2017 | Seo ........................... | H02P 7/29 |
| 2008/0116753 A1 * | 5/2008 | Carlucci ................ | A45D 20/10 310/50 |
| 2012/0119600 A1 * | 5/2012 | Dietl ...................... | H02K 23/08 310/50 |

* cited by examiner

*Primary Examiner* — Hanh Nguyen
(74) *Attorney, Agent, or Firm* — www.bobharter.com; Robert J. Harter

(57) ABSTRACT

A rechargeable air-moving system (e.g., a hair drier, a pet groomer, a liquid sprayer, a vacuum cleaner, etc.) has a rather high voltage universal motor powered by a relatively low voltage rechargeable battery. The battery provides the benefits of portability and low-voltage safety, and the high voltage motor provides the benefits of speed, being lightweight and compact. In some examples, high voltage from a domestic AC power source is reduced to low voltage to charge the battery, and then a step-up converter increases the low DC voltage from the battery to a much higher voltage for the motor. The magnitude of the high voltage from the converter is comparable to the high voltage of the domestic AC power source. The relatively high voltage from the converter powers a high voltage universal motor that is lighter and more compact than a low voltage universal motor of equivalent power.

20 Claims, 4 Drawing Sheets

HIGH VOLTAGE FAN MOTOR POWERED BY LOW VOLTAGE

FIELD OF THE DISCLOSURE

The present disclosure relates generally to universal motors for tools and appliances and more specifically to means for powering such motors.

BACKGROUND

A universal motor can operate on both AC and DC power. It is a commutated series-wound motor with a commutator that connects the stator's field coils in series with the rotor windings. Universal motors are sometimes known as an AC series motor. Universal motors can operate well on AC because the current in both the field coils and the armature (and their respective magnetic fields) will alternate (reverse polarity) synchronously with the supply. The resulting mechanical torque will occur in a consistent direction of rotation, independent of the direction of applied voltage. The developed torque is determined by the commutator and polarity of the field coils.

Universal motors can have high starting torque, can run at high speed, and can be lightweight and compact. They are commonly used in portable power tools and household appliances. Universal motors are also relatively easy to control electronically or via selectively tapping various coil points.

DETAILED DESCRIPTION

Figure 1:
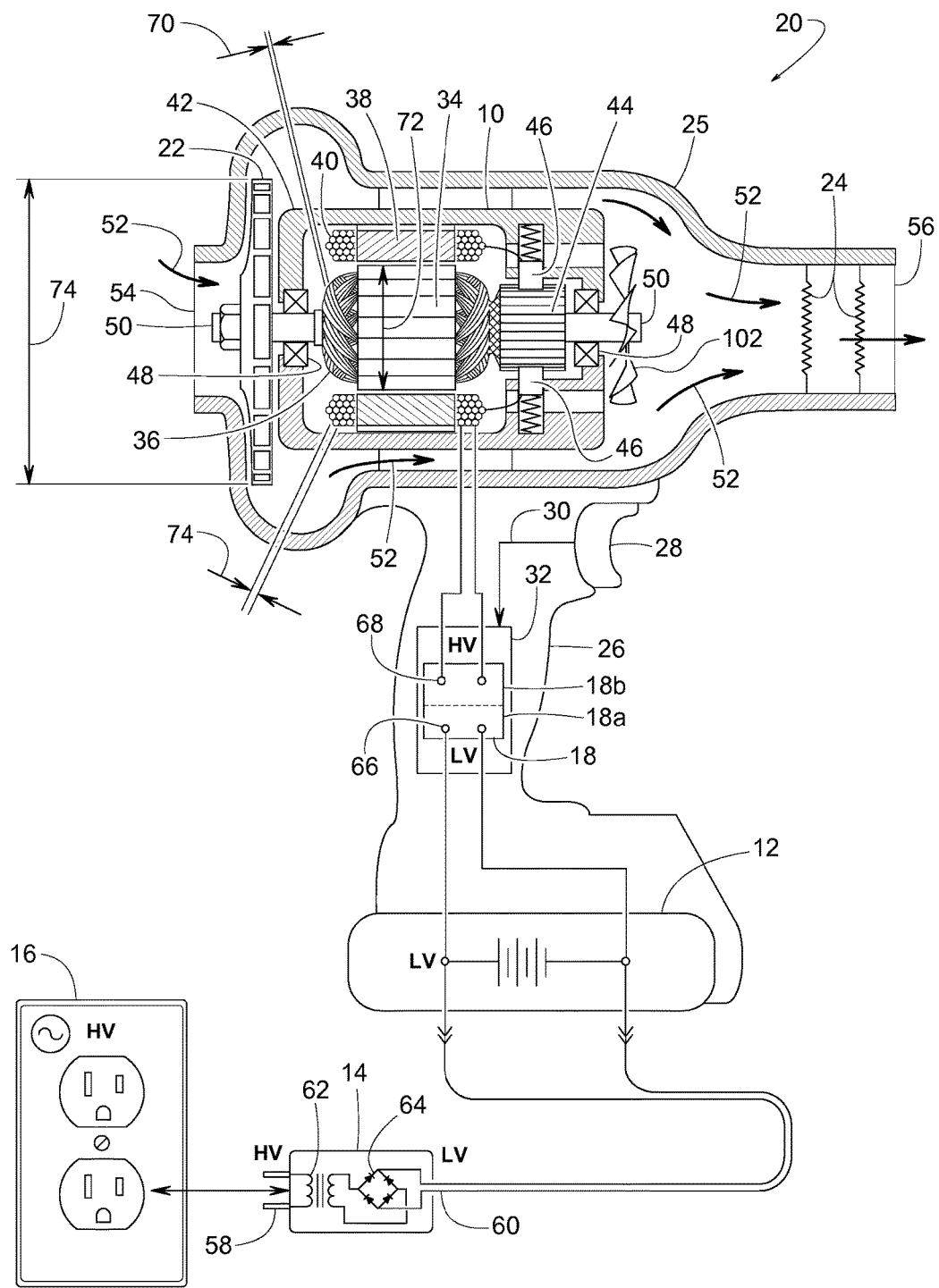
FIG. 1 is a cross-sectional side view of an example rechargeable air-moving system constructed in accordance with the teachings disclosed herein, wherein portions of the system are illustrated schematically.

FIGS. 1-4 illustrate example rechargeable air-moving systems and methods involving a relatively high voltage universal motor (electric motor 10) powered by a relatively low voltage rechargeable battery 12. Battery 12 provides the benefits of portability and low-voltage safety, and the high voltage motor 10 provides the benefits of speed, being lightweight and compact. In some examples, an AC-DC power supply 14 converts generally high voltage from a domestic AC power source 16 (e.g., 110 volts AC) to a significantly lower DC voltage suitable for charging battery 12. A step-up converter 18 then converts the relatively low DC voltage from battery 12 to a much higher voltage that is applied to motor 10.

FIG. 1 shows an example rechargeable air-moving system 20 that is particularly suited for use as a portable dryer for grooming animals. This example of system 20 comprises a plastic housing 25, battery 12, motor 10, a fan wheel 22, AC-DC power supply 14, step-up converter 18, and one or more optional electric heating elements 24. Housing 25 includes a handle 26 for manually manipulating system 20 and a trigger 28 for actuating motor 10. Line 30 and box 32 schematically represent known control circuitry for controlling the speed, rotational direction and/or other operations of motor 10 and/or for controlling step-up converter 18.

Figure 2:
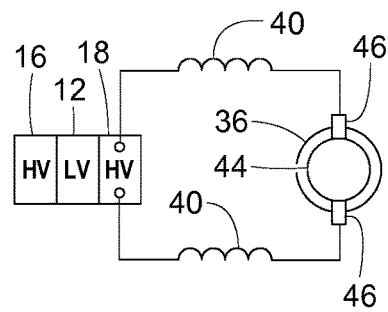
FIG. 2 is a wiring schematic of the system shown in FIG. 1.

Motor 10 comprises a rotor 34 with rotor windings 36, a stator 38 with stator windings 40, a bracket 42, a commutator 44, and brushes 46. In some examples, the components of motor 10 are wired as shown in FIG. 2, wherein commutator 44 and brushes 46 connect one or more stator windings 40 in series with rotor windings 36 in an arrangement characteristic of a conventional universal motor that can run on either alternating or direct current. Other examples of motor 10 have different wiring arrangements that are known to those of ordinary skill in the art. Bracket 42 provides structure for supporting brushes 46 and bearings 48. Bearings 48 support a shaft 50 of rotor 34.

Fan wheel 22 connects directly to shaft 50 such that fan wheel 22 and rotor 34 rotate as a unit and thus rotate at the same high speed. Fan wheel 22 forces a current of air 52 from an air inlet 54 in housing 25, around bracket 42, and out through an air outlet 56 of housing 25. The current of air 52 can be used for various purposes. In the example shown in FIG. 1, air 52 is heated by one or more heating elements 24 (e.g., a coiled wire with suitable electrical resistance) prior to discharging from housing 25 so that the heated air can be used for drying hair or animal fur.

Battery 12 powers motor 10 and, in some examples, powers heating elements 24 as well. For safe handling and for product availability, battery 12 has a nominal voltage of less than 50 volts DC. Example nominal voltage values of battery 12 include, but are not limited to, 12 volts, 24 volts, 36 volts and 48 volts. To recharge battery 12, system 20 uses AC-DC power supply 14 with a power supply input 58 that can be selectively plugged into AC power source 16 and a power supply output 60 for connecting to battery 12. In some examples, AC-DC power supply 14 comprises a step-down transformer 62 and a rectifier 64 (or known alternatives thereof) for providing output 60 with a power supply output voltage of less than 100 volts DC or at least marginally above the nominal voltage of battery 12 for charging purposes.

To enable battery 12, at its nominal low DC voltage, to power motor 10 at relatively high voltage, step-up converter 18 has a low voltage converter input 66 connected to battery 12 and a high voltage converter output 68 connected to motor 10. Step-up converter 18 converts low DC voltage received from battery 12 to much higher voltage for motor 10. In some examples, converter 18 offers the advantage of not having to isolate or insulate a low voltage side 18a of converter 18 in the manner required by a high voltage side 18b of converter 18. In examples where motor 10 is a universal motor that can run on either AC or DC, the converter output voltage at converter output 68 can be either AC or DC. In either case, the converter output voltage is at least 80 volts (AC or DC) to achieve certain benefits. Examples of such benefits include, but are not limited to, compactness of rotor 10, a minimal wire diameter 70 of rotor winding 36, and high rotational speed of rotor 34 and fan wheel 22.

Figure 3:
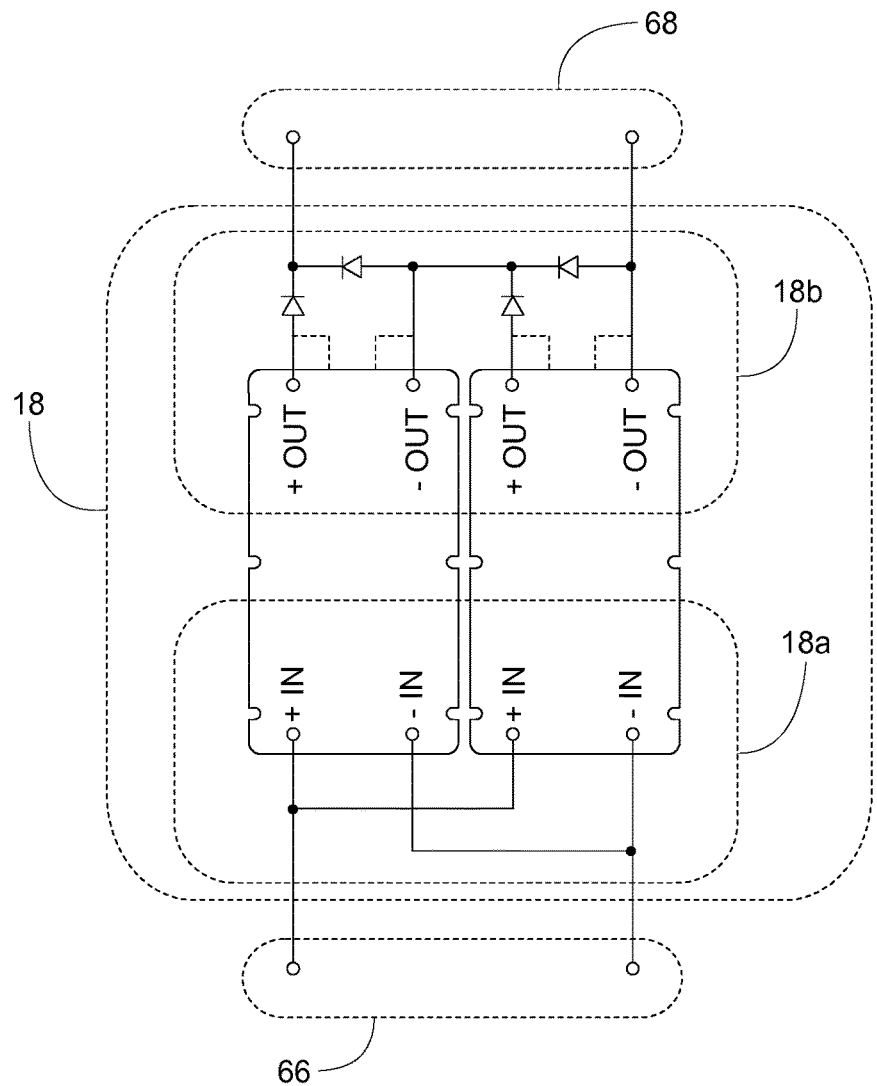
FIG. 3 is a schematic diagram of an example step-up converter.

In examples where step-up converter 18 delivers AC voltage to motor 10, step-up converter 18 comprises a suitable known DC-AC inverter. In examples where step-up converter 18 delivers DC voltage to motor 10, step-up converter 18 is a DC-DC step-up converter. One example of such a DC-DC step-up converter is a pair of V24A48E400BN units provided by Vicor Corporation of Andover, Mass. In some examples, the pair of Vicor units is connected in a series output configuration as shown in FIG. 3, wherein about 24 volts DC is applied to input 66 to provide a total of about 96 volts DC at output 68.

It is challenging to strike a balance in the need for (1) the safety and portability of a low voltage battery; (2) the speed, compactness and power of a high voltage motor; (3) the simplicity of a direct drive system versus a geared one; and (4) the desired pressure and volume of airflow. Rather than a process of optimization, the design process becomes more of a four-dimensional balancing act.

To achieve such a balance, the various specifications of system 20 are strategically chosen, rather than simply optimized. In some examples, rotor 34 has a rotor outer diameter 72 of 30 to 60 millimeters to provide a rotor that is lightweight and can handle extremely high speed. The high speed provides the necessary power at high speed with relatively low torque. In some examples, rotor winding 36 has a rotor wire gauge size of 20 to 30 AWG to encompass an average rotor wire diameter of about 0.86 to 0.29 millimeters. Such a wire size is sufficiently thin and flexible to be wrapped upon a relatively small diameter rotor core. In some examples, stator winding 40 has a stator wire gauge size of 14 to 28 AWG to encompass an average stator wire diameter 74 of about 1.71 to 0.36 millimeters. Since stator winding 40 is not subjected to any high rotational speed and since stator winding 40 conducts twice the current as rotor winding 36 and since the rotating rotor windings are cooled by windage, the wire diameter of stator winding 40 is, in most examples, larger than the wire diameter of rotor winding 36. In some examples, system 20 has a stator to rotor wire gauge ratio of 0.73 to 0.94 to provide motor 10 with a desired combination of speed, compactness, power, durability and air cooling. The stator to rotor wire gauge ratio is defined as a numerator divided by a denominator, wherein the numerator is defined as a stator wire gauge size of stator winding 40, and the denominator is defined as the rotor wire gauge size.

In some examples, certain voltage values of system 20 are strategically chosen to provide the necessary motor speed and power while still being compatible within the various motor specifications. In some examples, domestic AC power source 16 provides a source voltage of at least 100 volts AC at a frequency of 40 to 70 hertz (e.g., 110 volts AC at 60 hertz), as such voltage and frequency ranges are readily available in some countries. In some examples, the nominal voltage of battery 12 is 12 to 48 volts DC for safe handling and for product availability. In some examples, the converter output voltage of step-up converter 18 is at least 80 volts (AC or DC) at output 68. A converter output voltage of 80 to 120 volts provides motor 10 with the necessary speed and power without overloading the relatively small wire diameter of rotor winding 36. In some examples, step-up converter 18 drives motor 10 with 300 to 1,800 watts of power, which is often the maximum allowable for some domestic AC power sources protected by moderately sized fuses or circuit breakers. To balance the requirements of a relatively low voltage battery with a higher voltage motor, some examples of system 20 have a voltage ratio of 0.9 to 2.3. The voltage ratio is defined as a numerator divided by a denominator, wherein the numerator is the source voltage of the domestic AC power source 16 minus the nominal voltage of battery 12, and the denominator is the converter output voltage of step-up converter 18 minus the nominal voltage of battery 12.

To generate airflow at a desired pressure and volume flow rate and to do so with a robust direct drive system, some examples of rotor 34 have a fan outer diameter 74 of 40 to 170 millimeters and both rotor 34 and fan wheel 22 rotate at 10,000 to 50,000 rpm. To achieve a greater air pressure differential, some examples of system 20 include two or more fan wheels 22 connected in series-flow relationship, as shown in FIG. 4.

Figure 4:
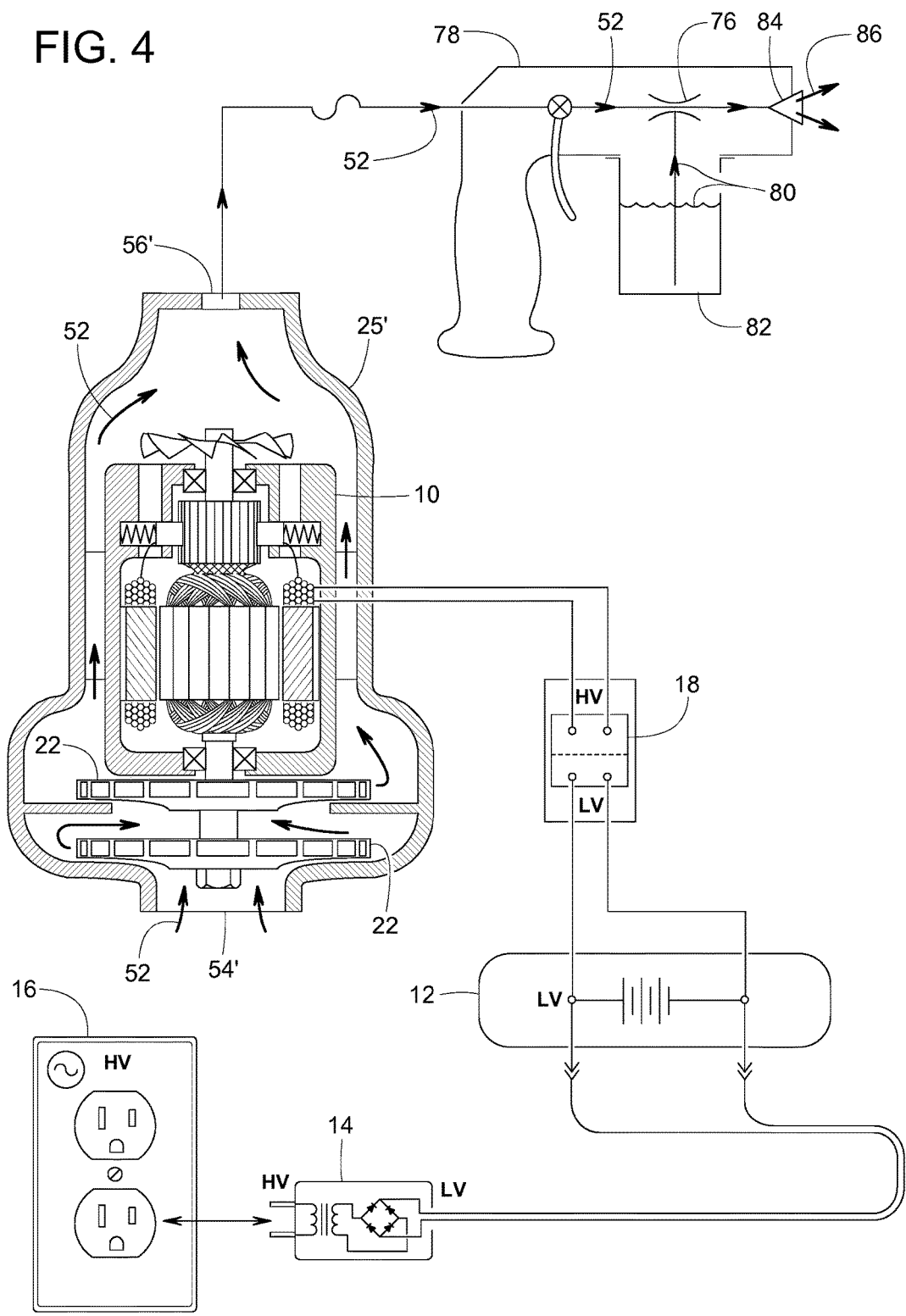
FIG. 4 is a cross-sectional side view of another example rechargeable air-moving system constructed in accordance with the teachings disclosed herein, wherein portions of the system are illustrated schematically.

In the example of FIG. 4, motor 10 rotates two fan wheels 22 within a housing 25' that has an air inlet 54' and an air outlet 56'. In this example, pressurized air 52 discharged from air outlet 56' flows through a Venturi effect device 76 of a handheld tool 78. Venturi effect device 76 is schematically illustrated to represent any restriction through which air 52 flows to create a reduced air pressure for drawing up a liquid 80 from a canister 82 or from some other liquid source. The drawn-up liquid 80 becomes entrained with air 52, and a nozzle 84 of tool 78 discharges the resulting mixture 86 of air 52 and liquid 80. Examples of Venturi effect device 76 include, but are not limited to, a venturi, an educator, an inspirator, an atomizer, and an orifice. Examples of liquid 80 include, but are not limited to, a paint, a pesticide, an herbicide, a fertilizer, and a tanning dye.

Figure 5:
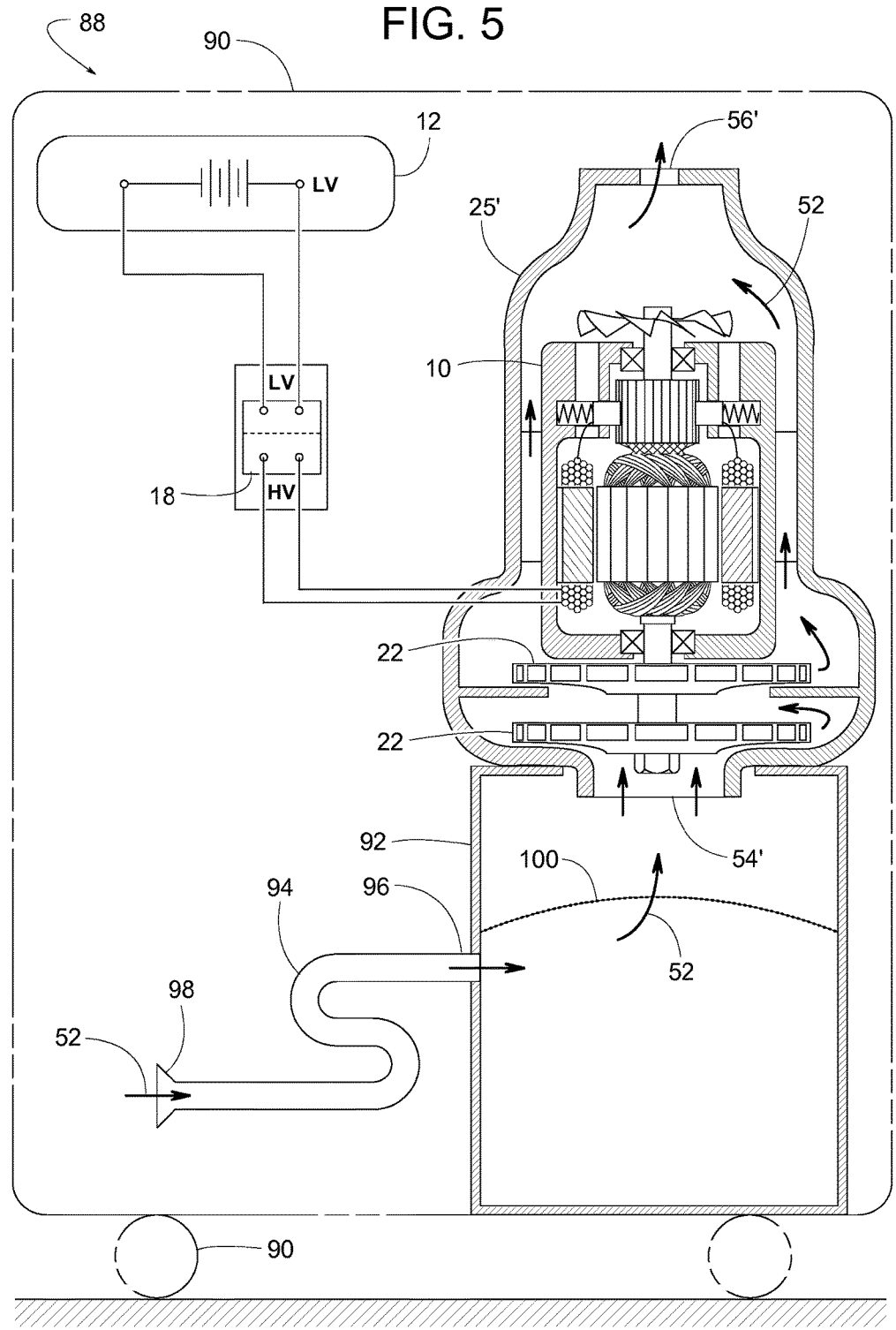
FIG. 5 is a cross-sectional side view of another example rechargeable air-moving system constructed in accordance with the teachings disclosed herein, wherein portions of the system are illustrated schematically.

FIG. 5 shows an example rechargeable air-moving system 88 functioning as a vacuum cleaner, wherein motor 10, fan wheels 22 and housing 25' are vacuum cleaner components. System 88 is particularly useful as a central vacuum installed in a vehicle 90 such as a motorhome, camper or bus. Vehicle 88 has its own battery 12 and recharging means, such as a generator or an alternator with suitable rectification.

In the illustrated example, air inlet 54' of housing 25' connects to a canister 92 to create negative or subatmospheric pressure within canister 92. A vacuum hose 94 has a downstream end 96 for connection to canister 92 and a free upstream end 98 for sucking up dust and other dirt particles inside vehicle 90. Air, dust and dirt flow in series from within vehicle 90, though free upstream end 98, through vacuum hose 94, through downstream end 96, and into canister 92. In some examples, a filter 100 inside canister 92 separates the dust and dirt from air 52 so that the dust and dirt collect at the bottom of canister 92, and air 52 flow up through filter 100, through air inlet 54', sequentially through fan wheels 22, through housing 25', and out through air outlet 56'.

Additional points worth noting are as follows. The term, "domestic AC power source" refers to single-phase electrical power normally used for powering household and light commercial electric items such as lamps, televisions, sewing machines, vacuum cleaners, hair driers, microwave ovens, etc. Domestic AC power is sometimes known as, mains electricity, household power and house current. Common voltage values of domestic AC power include, but are not limited to, 100 to 127 volts, and a nominal 230 volts. Common frequencies of domestic power range from about 50 to 60 hertz. In some examples, single-phase alternating voltage from a domestic AC power source is provided by two legs of a three-phase system. Alternating voltage values specified herein pertain to root-mean-squared values. The term, "AC" refers to alternating current, and the term, "DC" refers to direct current. All specified wire gauge sizes mentioned herein are in terms of AWG (American Wire Gauge). References herein to the average rotor wire diameter and the average stator wire diameter pertain to the diameter of the metal conductive portion of the wire exclusive of any coating or electrical insulation on the wire. Some examples of motor 10 include a motor-cooling fan 102 mounted on shaft 50.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A rechargeable air-moving system for moving air, the rechargeable air-moving system being rechargeable by a domestic AC power source that provides a source voltage of at least 100 volts AC at a frequency of 40 to 70 hertz, the rechargeable air-moving system comprising:
   a housing defining an air inlet and an air outlet, the housing having a handle for manually supporting and manipulating the housing;
   a battery having a nominal voltage of less than 50 volts DC;
   an AC-DC power supply having a power supply input and a power supply output, the power supply input being connectable to the domestic AC power source to receive at least 100 volts AC, and the power supply output being connected to the battery, the power supply output providing a power supply output voltage of less than 100 volts DC;
   a step-up converter having a converter input and a converter output, the converter input being connected to the battery to receive the nominal voltage of less than 50 volts DC, the converter output providing a converter output voltage of at least 80 volts;
   an electric motor comprising a commutator, a stator winding, a rotor, and a rotor winding supported by the rotor; the commutator being rotatable relative to the stator winding and the housing, the rotor winding being rotatable relative to the stator winding and the housing, the rotor being rotatable relative to the stator winding and the housing, the commutator connecting the stator winding in series with the rotor winding, the stator winding being connected to the converter output to receive the converter output voltage of at least 80 volts, the rotor having a rotor outer diameter of 30 to 60 millimeters, the rotor winding having a rotor wire gauge size of 20 to 30 AWG; and
   a fan wheel coupled to the rotor such that the fan wheel and the rotor rotate as a unit at a rotational speed of between 10,000 and 50,000 rpm to produce a current of air flowing from the air inlet to the air outlet, the fan wheel having a fan outer diameter of 40 to 170 millimeters, and the motor receiving electrical power from the converter at a rate of 300 to 1,800 watts.

2. The rechargeable air-moving system of claim 1, wherein the step-up converter is a DC-DC converter, and the converter output voltage of at least 80 volts is at least 80 volts DC.

3. The rechargeable air-moving system of claim 1, wherein the step-up converter is a DC-AC inverter, and the converter output voltage of at least 80 volts is at least 80 volts AC.

4. The rechargeable air-moving system of claim 1, wherein the rechargeable air-moving system has a stator to rotor wire gauge ratio of 0.73 to 0.94, wherein the stator to rotor wire gauge ratio is defined as a numerator divided by a denominator, wherein the numerator is defined as a stator wire gauge size of the stator winding, and the denominator is defined as the rotor wire gauge size.

5. The rechargeable air-moving system of claim 1, wherein the rechargeable air-moving system has a voltage ratio of 0.9 to 2.3, the voltage ratio being defined as a numerator divided by a denominator, wherein the numerator is defined as the source voltage minus the nominal voltage of the battery, and the denominator is defined as the converter output voltage minus the nominal voltage of the battery.

6. The rechargeable air-moving system of claim 1, wherein the stator winding has a stator wire gauge size of 14 to 28 AWG.

7. The rechargeable air-moving system of claim 1, wherein the stator winding has an average stator wire diameter that is greater than an average rotor wire diameter of the rotor winding.

8. The rechargeable air-moving system of claim 1, further comprising an electric heating element powered by the battery, the electric heating element being in heat transfer relationship with the current of air.

9. The rechargeable air-moving system of claim 1, further comprising:
   a Venturi effect device through which the current of air flows; and
   a canister containing a liquid that is connected in fluid communication with the Venturi effect device.

10. The rechargeable air-moving system of claim 9, wherein the liquid is a paint.

11. The rechargeable air-moving system of claim 1, wherein the liquid includes a pesticide.

12. The rechargeable air-moving system of claim 1, wherein the liquid includes a herbicide.

13. The rechargeable air-moving system of claim 12, wherein the stator winding has an average stator wire diameter that is greater than an average rotor wire diameter of the rotor winding.

14. The rechargeable air-moving system of claim 1, wherein the liquid includes a fertilizer.

15. The rechargeable air-moving system of claim 1, wherein the liquid includes a tanning dye.

16. The rechargeable air-moving system of claim 1, wherein the electric motor, the fan wheel and the housing are vacuum cleaner components.

17. An air-moving system for vacuuming air within a vehicle that has a rechargeable battery with a nominal voltage of less than 50 volts DC, the rechargeable air-moving system comprising:
   a housing defining an air inlet and an air outlet, the housing being carried by the vehicle;
   a vacuum hose connected to the air inlet;
   a step-up converter having a converter input and a converter output, the converter input being connected to the battery to receive the nominal voltage of less than 50 volts DC, the converter output providing a converter output voltage of at least 80 volts;
   an electric motor supported by the housing, the electric motor comprising a commutator, a stator winding, a rotor, and a rotor winding supported by the rotor; the commutator being rotatable relative to the stator winding and the housing, the rotor winding being rotatable relative to the stator winding and the housing, the rotor being rotatable relative to the stator winding and the housing, the commutator connecting the stator winding in series with the rotor winding, the stator winding being connected to the converter output to receive the converter output voltage of at least 80 volts, the rotor having a rotor outer diameter of 30 to 60 millimeters, the rotor winding having a rotor wire gauge size of 20 to 30 AWG; and a fan wheel coupled to the rotor such that the fan wheel and the rotor rotate as a unit at a rotational speed of between 10,000 and 50,000 rpm to produce a current of air flowing from the air inlet to the air outlet, the fan wheel having a fan outer diameter of 40 to 170 millimeters, and the motor receiving electrical power from the step-up converter at a rate of 300 to 1,800 watts.

18. The rechargeable air-moving system of claim 17, wherein the rechargeable air-moving system has a stator to rotor wire gauge ratio of 0.73 to 0.94, wherein the stator to rotor wire gauge ratio is defined as a numerator divided by a denominator, the numerator is defined as a stator wire gauge size of the stator winding, and the denominator is defined as the rotor wire gauge size.

19. The rechargeable air-moving system of claim 17, wherein the rechargeable air-moving system has a voltage ratio of 0.9 to 2.3, the voltage ratio being defined as a numerator divided by a denominator, wherein the numerator is defined as the source voltage minus the nominal voltage of the battery, and the denominator is defined as the converter output voltage minus the nominal voltage of the battery.

20. A rechargeable air-moving method for creating a current of air, the rechargeable air-moving method involving the use of a domestic AC power source that provides a voltage source of at least 100 volts AC at a frequency of 40 to 70 hertz, the rechargeable air-moving method comprising:

connecting the domestic AC power source to a battery;

the domestic AC power source charging the battery to a nominal voltage of 12 to 50 volts DC;

disconnecting the domestic AC power source from the battery;

applying the nominal voltage of 12 to 50 volts DC from the battery to a converter input of a step-up converter;

the step-up converter converting the nominal voltage of 12 to 50 volts DC from the converter input to a converter output voltage of at least 80 volts at a converter output of the step-up converter;

applying the converter output voltage of at least 80 volts to a stator winding of an electric motor, wherein the electric motor comprises a commutator, the stator winding, a rotor, and a rotor winding supported by the rotor, wherein the rotor has a rotor outer diameter of 30 to 60 millimeters, and the rotor winding has an average rotor wire diameter of 0.29 to 0.86 millimeters;

the step-up converter delivering electrical power to the motor at a rate of 300 to 1,800 watts;

the commutator connecting the stator winding in series with the rotor winding;

the rotor, the rotor winding and the commutator rotating relative to the stator winding at a rotational speed of 10,000 to 50,000 rpm;

the rotor rotating a fan wheel at the rotational speed of 10,000 to 50,000 rpm, wherein the fan wheel has a fan outer diameter of 40 to 170 millimeters; and the fan wheel rotating at the rotational speed of 10,000 to 50,000 rpm creating the current of air.

* * * * *